April 21, 1936.  F. R. MILLER  2,038,306

GRILLWORK

Filed Aug. 3, 1934  2 Sheets-Sheet 1

INVENTOR
Frank R. Miller
by his attorneys
Byrnes, Stebbins & Blenko

April 21, 1936.  F. R. MILLER  2,038,306
GRILLWORK
Filed Aug. 3, 1934   2 Sheets-Sheet 2

INVENTOR
Frank R. Miller
by his attorneys
Byrnes, Stebbins & Blenko

Patented Apr. 21, 1936

2,038,306

UNITED STATES PATENT OFFICE 2,038,306

GRILLWORK

Frank R. Miller, Wheeling, W. Va., assignor to The Consolidated Expanded Metal Companies, Wheeling, W. Va., a corporation of West Virginia Application August 3, 1934, Serial No. 738,239

4 Claims. (Cl. 189—82)

My invention relates to a metallic screen or grill work such as is employed in a wide variety of installations, for example, partitions in banks, offices, and the walls of elevator cages, to mention only a few.

Metallic grill work as previously made has been characterized by a high cost which has limited its utility to a considerable degree. I have invented a metallic screen or grill work which may be produced at low cost and which is effective to serve every purpose of such grill work as heretofore manufactured.

In accordance with my invention, I superpose a plurality of perforated, reticulated or foraminous, metal sheets, the openings in one sheet being out of alinement with the other sheet or sheets. Preferably, the foraminous sheets are of flattened, expanded metal mesh but may be formed in any other convenient way. The invention permits the manufacture of a variety of different designs of grill work having an attractive appearance and serving the usual purposes of metal grill work very effectively. The several foraminous sheets may be joined together in any convenient manner, as by spot welding.

For a complete understanding of the invention, reference is made to the accompanying drawings illustrating a preferred embodiment of the invention and a few modifications thereof. In the drawings.

Figure 1:
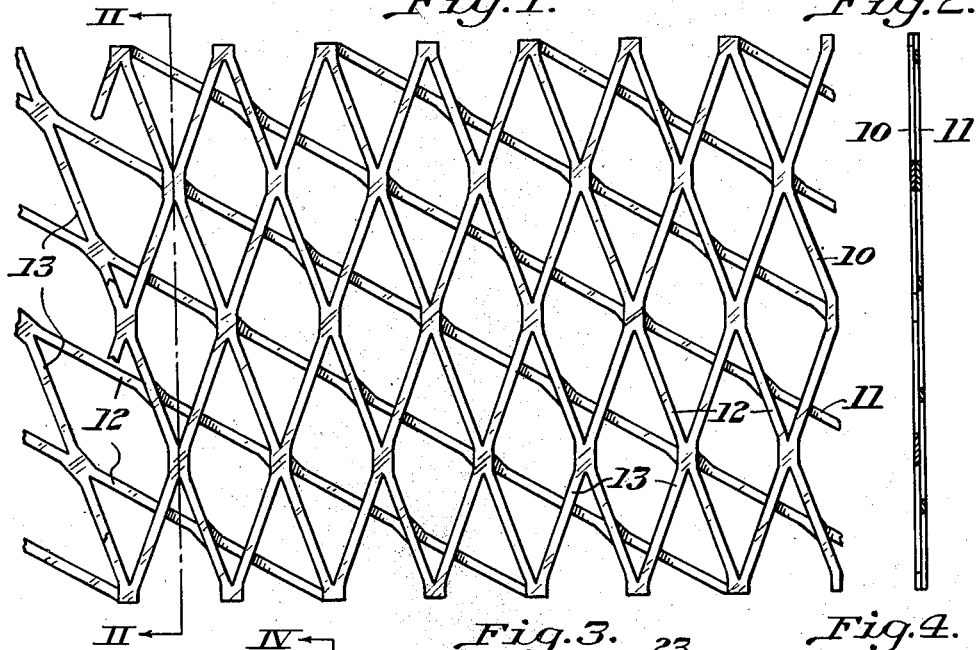
Figure 1 illustrates one form of grill work in accordance with my invention.
Figure 2:
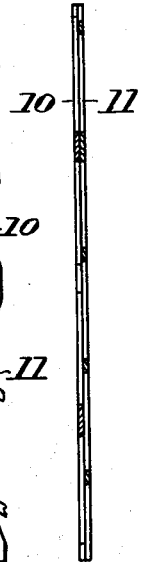
Figure 2 is a sectional view along the line II—II of Figure 1.

Referring now in detail to the drawings, Figures 1 and 2 show a grill work composed of foraminous sheets 10 and 11 superposed one on the other. The sheet 10 is in the form of a mesh having parallel strands 12 intersecting other parallel strands 13 at an oblique angle. The sheet 11 is similar. In Figure 1, the two sheets are arranged so that the strands 13 of the sheet 11 are in line with the strands 12 of the sheet 10. The strands 12 of the sheet 11 intersect the strands 12 and 13 of the sheet 10 at oblique angles, providing a very pleasing pattern.

The sheets 10 and 11 are preferably secured to each other by spot welding at intervals. The points at which the welding is effected are buffed or polished after the completion of the welding so that the surface of the completed grill is quite uniform and is entirely unmarred by the spot welding.

The sheets 10 and 11 are preferably composed of flattened, expanded metal mesh, made according to methods now known. The completed grill has an appearance simulating that of a woven grill but its cost is a great deal less.

Figure 3:
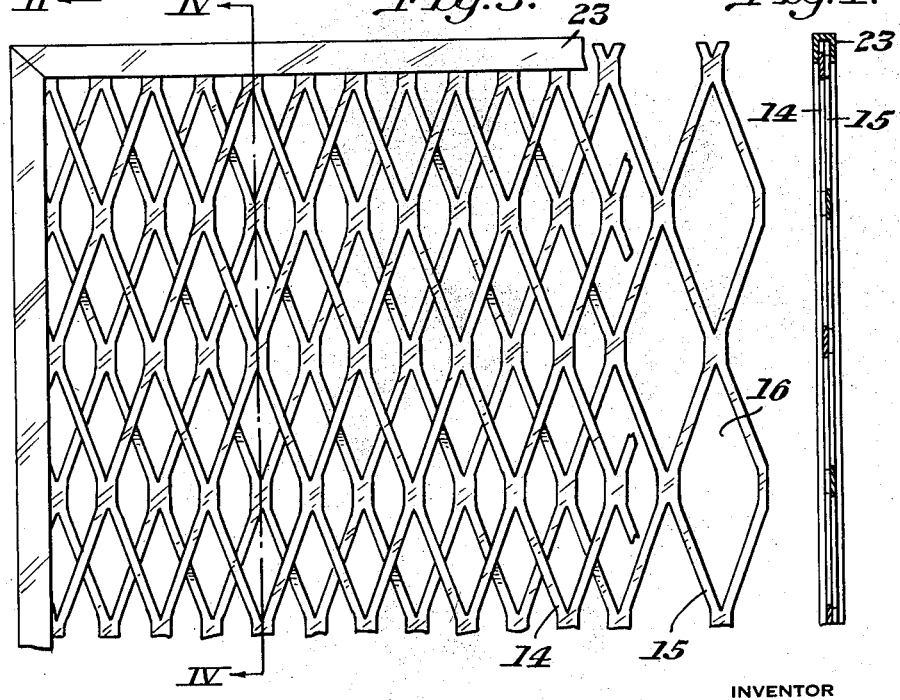
Figure 3 illustrates a modified form of grill work.
Figure 4:
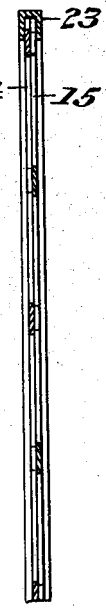
Figure 4 is a sectional view along the line IV—IV of Figure 3.

Figures 3 and 4 illustrate another form of the invention in which sheets 14 and 15, similar to those shown at 10 and 11 of Figure 1, are assembled in a slightly different manner. In the modification of Figures 3 and 4, the diamond-shaped openings 16 in one of the sheets are centered on the intersections of the strands of the other sheet. This arrangement, of course, provides a completed grill of a rather fine mesh.

Figure 5:
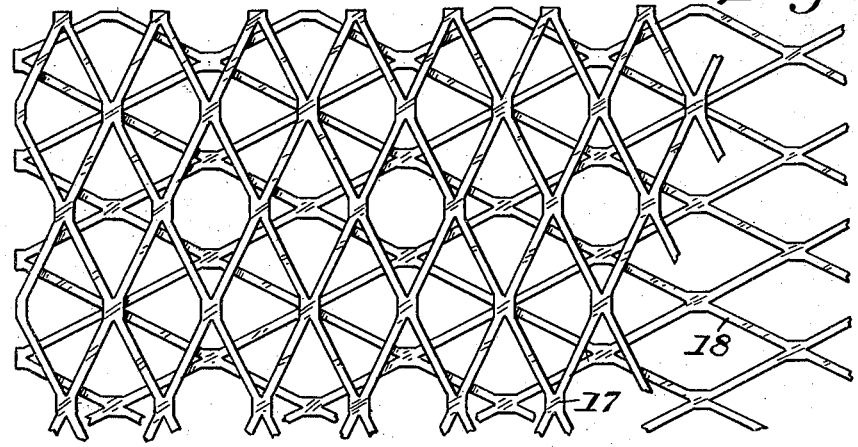
Figure 5 shows a further modified form of grill work according to my invention.

Figure 5 illustrates a particularly attractive grill pattern produced by arranging sheets 17 and 18 with the long diagonals of the diamonds of the two sheets at right angles. The diamonds are so dimensioned, furthermore, that their long diagonal is substantially twice their short diagonal. It will be apparent that the pattern of Figure 5 gives the effect of being composed of a plurality of circles with interleaved, rectilinear strands.

Figure 6:
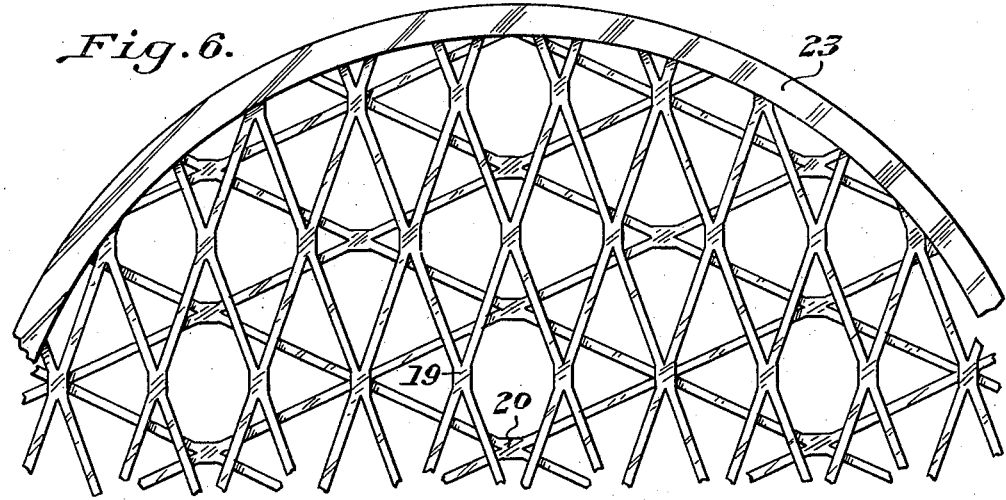
Figure 6 illustrates still a different arrangement.

Figure 6 is another example of the numerous attractive patterns that can be worked out by assembling a plurality of foraminous sheets with the openings therein disposed out of alinement with each other. The grill of Figure 6 is composed of sheets 19 and 20. The openings in the two sheets are disposed at substantially right angles but are of different dimensions. The advantage of this arrangement is that the border of a circular grill may be given an appearance somewhat different from that of the central portion thereof.

Figure 7:
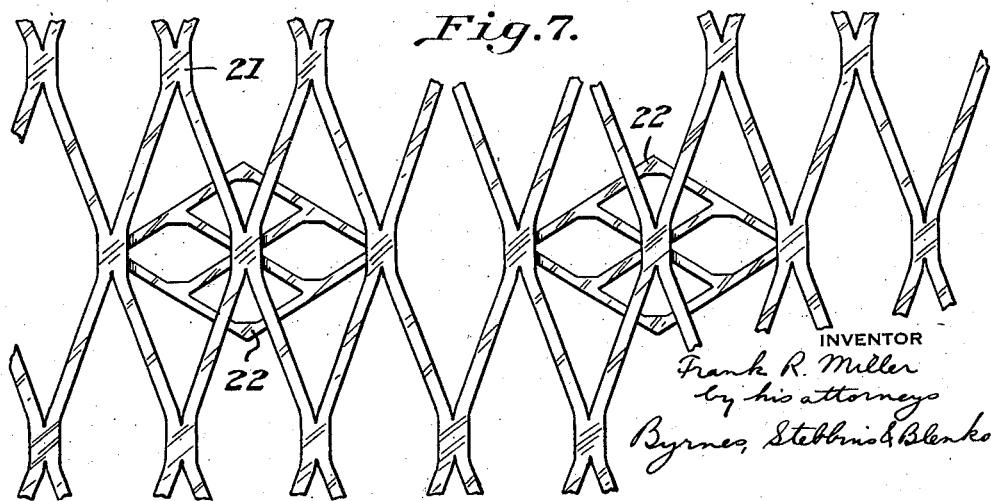
Figure 7 shows another modification wherein small sheets are attached at spaced intervals to the larger sheet.

Figure 7 illustrates a grill work composed of a foraminous sheet 21, and a plurality of portions 22 of similar material attached thereto at regular intervals, in any desired pattern. The portions 22 are preferably spot welded to the sheet 21, the weld being ground off, as before stated. This arrangement is particularly desirable for grills of large sizes.

The grill work when completed may be lacquered, painted, or otherwise coated to provide the desired finish. This further conceals the plane of separation between the sheets forming the grill.

Instead of spot welding the foraminous sheets together at wide intervals, they may be held together by a binding frame 23 of sheet metal, as shown in Figures 3 and 6.

It will be apparent from the foregoing description that the invention provides for the manufacture of metal grill work of a wide variety of designs, all having an attractive appearance, at a comparatively low cost. The grill work of my invention can be used in practically any location where grill work manufactured according to previous methods is employed. The grill of my invention can be made of any desired strength, simply by properly dimensioning the thickness of the sheets. Almost any degree of fineness of mesh, furthermore, can be obtained, this being a relatively simple matter in the sheet metal expanding art.

Although I have illustrated several modifications of the invention herein, it will be apparent that numerous changes in the article and method of its manufacture as disclosed, may be made without departing from the spirit of the invention or the scope of the appended claims.

I claim:

1. A grill comprising a plurality of similar sheets of expanded metal mesh, superposed one on the other to constitute a decorative wall panel, the openings in one sheet differing in size from those in the other.

2. A grill comprising a plurality of superposed sheets of expanded metal mesh, the openings of the several sheets being out of alignment with each other constituting an ornamental wall panel having a general appearance different from that of any sheet.

3. A grill comprising a plurality of superposed sheets of expanded metal mesh, the openings of the several sheets being disposed at an angle to each other, constituting an ornamental wall panel having a patterned effect different from that of any sheet.

4. A grill comprising a plurality of sheets of openwork material each having a plane face, superimposed with the openings in the respective sheets out of alinement with each other and with said plane faces in contact so as to constitute an ornamental grill having a general appearance different from that of any of its component sheets.

FRANK R. MILLER.